United States Patent Office 3,185,741
Patented May 25, 1965

3,185,741
DIENE TRIMERIZATION
Ernest A. Zuech and William G. Roberts, Bartlesville, Okla., assignors to Phillips Petroleum Company, a corporation of Delaware
No Drawing. Filed Nov. 19, 1962, Ser. No. 238,747
12 Claims. (Cl. 260—666)

This invention relates to the trimerization of dienes to cyclic aligomers. In one aspect the invention relates to making cyclic trimers of conjugated aliphatic dienes. In another aspect the invention relates to making 1,5,9-cyclododecatrienes by trimerizing butadiene, piperylene or isoprene in the presence of a catalyst formed by the admixture of titanium tetrachloride and diethylaluminum chloride and vanadium tetrachloride or vanadium oxytrichloride.

Various methods have been disclosed for the trimerization of dienes to cyclic aligomers. For example, U.S. Patent 2,964,574 of Gunther Wilke discloses the production of trans, trans, cis-1,5,9-cyclododecatriene by trimerizing butadiene in the presence of titanium tetrachloride and dialkylaluminum chloride. Other processes and catalysts are known by which the cyclic trimers of other conjugated dienes such as isoprene and piperylene can be prepared. While some of these catalyst systems are suitable for the production of the desired cyclic trimers in high yields, in many instances the reaction rate is sufficiently slow that many hours of reaction time are necessary to obtain the desired yields.

An object of this invention is to provide a new catalyst system for converting conjugated dienes to cyclododecatrienes at a reaction rate substantially faster than previously known catalyst systems.

Another object of this invention is to provide an improved process for the production of cyclododecatrienes from conjugated dienes.

Other aspects, objects and the advantages of my invention are apparent in the written description and the claims.

According to this invention, the trimerization of conjugated dienes to cyclododecatrienes is effected at an increased rate by utilizing a catalyst system formed by admixing a dialkylaluminum halide, titanium tetrachloride and a vanadium compound selected from the group consisting of vanadium tetrachloride and vanadium oxytrichloride. Preferably, the dialkylaluminum halide is a dialkylaluminum chloride, a preferred compound being diethylaluminum chloride. The invention is particularly adapted to the conversion of 1,3-butadiene to trans, trans, cis-1,5,9-cyclododecatriene but is also applicable to the conversion of isoprene and piperylene to the corresponding trimethylcyclododecatrienes. The process is carried out by contacting one of the specified dienes with the above-specified catalyst system at a temperature generally in the range of 0 to 75° C. The pressure maintained in the reaction zone will usually be in the range from atmospheric to 100 p.s.i. However, higher or lower pressures can be employed.

Some examples of dialkylaluminum halides which can be employed are dimethylaluminum bromide, diethylaluminum chloride, diethylaluminum iodide, di-n-propylaluminum bromide, diisopropylaluminum iodide, di-n-butylaluminum chloride, and diisobutylaluminum bromide.

In the catalyst system of this invention, formed by the admixture of a dialkylaluminum halide, titanium tetrachloride and a vanadium compound selected from the group consisting of $VCl_4$ and $VOCl_3$, the catalyst components are charged such that the Ti/V mole ratio will generally fall within the range of from 1/1 to 6/1 and the Al/Ti mole ratio will generally fall within the range of from 2/1 to 10/1.

Furthermore, in utilizing the catalyst system formed of three components to effect the trimerization of aliphatic conjugated dienes to 1,5,9-cyclododecatrienes, it is undesirable to permit contact of the vanadium component and the dialkylaluminum halide component in the absence of the titanium component. Thus, we prefer to charge either the vanadium component or the dilakylaluminum halide component last. The most preferred method of charging the catalyst components is to charge the $TiCl_4$ and the vanadium components, and thereafter contact the mixture of these components with the dialkylaluminum halide component. After the catalyst components have been contacted together as described above, the diene to be trimerized is then contacted with the catalyst.

The process of this invention can be carried out in the presence or absence of a diluent. If a diluent is employed, it is most convenient to have the diluent in the reaction vessel prior to charging the catalyst components.

After the trimerization reaction has been completed, the 1,5,9-cyclododecatrienes can be recovered from the reaction mixture by such methods as distillation. Unreacted diene reactant and diluent can be separated in such a distillation and recycled to the trimerization reaction.

While the process has been described with particular reference to a batch operation, it is to be understood that the reaction can be carried out either batchwise or continuous.

Adequate stirring or mixing of the material in the reaction zone should be provided. Preferably, a diluent is employed in the reaction zone to lower the viscosity of the reaction mixture, thus allowing better mixing and simplifying recovery of the desired cyclic triene. Some examples of diluents useful in the practice of this invention are benzene, cyclohexane, n-heptane, chlorobenzene, and the like, and mixtures thereof. Any diluent which is inert with respect to the catalyst system and to the other materials in the reaction zone, including the reactant and reaction products, including the desired reaction product and other products either intermediate or other final products, can be used.

The invention is not limited to the use of pure diolefin starting materials. It is possible to use as starting materials mixtures which contain the desired diolefin. For example, dehydrogenation products of butane and butylene which contain butadiene can be utilized successfully. Of course, the starting material should not contain any material which has a harmful effect on the catalyst activity. The butane and butenes present in the above-referred-to dehydrogenation product are not harmful to the catalyst.

The trimers of isoprene and piperylene are both trimethylcyclododecatrienes. In the case of the isoprene trimer, each of the three methyl groups is attached to a carbon atom which is attached to another carbon atom by a double bond. The piperylene trimer has the methyl groups attached to carbon atoms which are attached to other carbon atoms by single bonds.

The advantages of using the new catalyst system of this invention, and thus obtaining the increased reaction rate obtainable by the use of this system, are obvious to those skilled in this field. For example, in a commercial unit in which 1,3-butadiene is trimerized to cyclododecatriene, the shorter reaction time necessary to obtain a given yield of cyclododecatriene allows one to utilize smaller reaction vessels, thus reducing the initial capital investment.

The following examples illustrate the operation and the advantages of the invention but are not intended to limit the invention to the specific features illustrated in the runs.

EXAMPLE I

A series of runs was carried out in which 1,3-butadiene was trimerized to trans, trans, cis-1,5,9-cyclododecatriene in the presence of a catalyst system comprising diethylaluminum chloride. In some instances the complete system comprised the diethylaluminum chloride plus titanium tetrachloride; in others, diethylaluminum chloride plus either vanadium tetrachloride or vanadium oxytrichloride; while in others a three-component system comprising diethylaluminum chloride, titanium tetrachloride, and one of the named vanadium compounds were used. As shown in the tabulated data below (Table I), the trimerization is effected at a much faster rate when both the vanadium and titanium salts are used in conjunction with diethylaluminum chloride than when either one is employed alone.

In each run of this series, 50 ml. of benzene was charged to either a 7-ounce (Runs 7, 8, 9) or 12-ounce (Runs 1–6) beverage bottle, after which the catalyst components were charged in the desired order by means of a syringe inserted through the rubber seal of the perforated crown cap sealing the bottle. Gaseous butadiene from a cylinder was then admitted to the bottle through a syringe. The manifold line from the cylinder to the bottle was left attached so that, as the pressure in the bottle fell below that of the cylinder due to butadiene polymerization, additional butadiene was charged to keep the system at equilibrium pressure. Throughout these runs, the pressures in the beverage bottles generally ranged from 15 to 25 p.s.i.g. The butadiene was first charged at room temperature and the trimerization initiated at this temperature, but since no temperature control was used, the bottles warmed up rapidly due to the exothermic reaction taking place. The maximum temperatures ranged up to but did not exceed about 70° C.

The results of these runs are tabulated below as Table I. In Run 6 of Table I, for example, of the 161 grams of butadiene taken up, 113 grams of trans, trans, cis-1,5,9-cyclododecatriene, 2.4 grams of 1,5-cyclooctadiene, 0.3 gram of vinylcyclohexene and 12 grams of rubbery polymer were recovered. In Table I, trans, trans, cis-1,5,9-cyclododecatriene is identified as CDT.

millimols of $TiCl_4$ are charged to the reaction zone. After introduction of the metal halides, 16 millimols of diethylaluminum chloride is charged to said zone. Isoprene is then charged dropwise to said reaction zone, and cooling is supplied to hold the temperature of the reaction medium below 75° C. A rapid conversion of isoprene to 1,5,9-trimethyl-1,5,9-cyclododecatriene is obtained. The rate of trimerization is much faster in this run than in a similar run when $VCl_4$ is omitted from the catalyst system.

EXAMPLE III

In a run carried out by the process of this invention piperylene is trimerized to trimethyl-1,5,9-cyclododecatriene. In this run, 50 ml. of cyclohexane is charged to a reaction zone after which 1 millimol of $VCl_4$ and 6 millimols of $TiCl_4$ are charged to the reaction zone. After introduction of the metal halides, 60 millimols of diethylaluminum chloride is charged to said zone. Piperylene is then charged dropwise to said reaction zone, and cooling is supplied to hold the temperature of the reaction media below 75° C. A rapid conversion of piperylene to trimethyl-1,5,9-cyclododecatriene is obtained. The rate of trimerization is much faster in this run than in a similar run when $VCl_4$ is omitted from the catalyst system.

EXAMPLE IV

In another run carried out by the process of this invention, 100 ml. of isooctane is charged to a reaction zone, after which 1 millimol each of $VOCl_3$ and $TiCl_4$ are charged to the reaction zone. After introduction of the metal halide, 2 millimols of diisobutylaluminum iodide is charged to said zone. Butadiene is charged to the reaction zone from a cylinder by the method of Example I, and cooling is supplied to maintain the temperature of the reaction mixture at 50° C. A rapid conversion of butadiene to trans, trans, cis-1,5,9-cyclododecatriene is obtained. Comparison of the reaction rate with that of a similar run excluding $VOCl_3$ shows the advantage of the

*Table I*

| Run No. | Millimoles $Et_2AlCl$, catalyst component A charged | Millimoles $TiCl_4$, catalyst component B charged | Vanadium salt charged | Millimoles Vanadium salt catalyst component C charged | Order of addition of catalyst components | Ti/V, mol ratio | Al/Ti, mol ratio | Butadiene uptake in grams after X hours | | | | Yield CDT grams | Percent of butadiene uptake represented by CDT |
|---|---|---|---|---|---|---|---|---|---|---|---|---|---|
| | | | | | | | | 2 | 3 | 4 | 5 | | |
| 1 | 16 | 4 | None | | BA | | 4 | | | 110 | | 71 | 65 |
| 2 | 16 | None | $VCl_4$ | 4 | CA | | | 7 gms. butadiene polymer. | | | | polymerized to tough | |
| 3 | 16 | 3 | $VCl_4$ | 1 | BCA | 3 | 5.33 | | | 124 | | 91 | 74 |
| 4 | 16 | 4 | $VCl_4$ | 1 | ACB | 4 | 4 | | | | 118 | Not det. | |
| 5 | 16 | 4 | $VCl_4$ | 1 | ABC | 4 | 4 | | | | 143 | Not det. | |
| 6 | 16 | 4 | $VCl_4$ | 1 | BCA | 4 | 4 | | | | 161 | 113 | 70 |
| 3 | 16 | 3 | $VCl_4$ | 1 | BCA | 3 | 5.33 | | | 124 | | 91 | 74 |
| 7 | 16 | 4 | $VOCl_3$ | 1 | BCA | 4 | 4 | | 112 | | | 84 | 75 |
| 8 | 16 | 2 | None | | BA | | 8 | 57 | | | | 43 | 75 |
| 9 | 16 | 2 | $VCl_4$ | 2 | BCA | 1 | 8 | 68 | | | | 52 | 76 |

By comparing Runs 1, 2, and 3, it can be seen that the three-component catalyst system of this invention is superior to either of the possible two-component systems employing a dialkylaluminum halide and one of the metal halide components. Comparison of Runs 4 and 5 with Runs 3 and 6 clearly shows that it is undesirable to permit contact of the vanadium component and the dialkylaluminum halide component in the absence of the titanium component. Run 7 shows that $VOCl_3$ can be used as the vanadium component, while Runs 8 and 9 show the advantages of the three-component system at a higher Al/Ti mol ratio.

EXAMPLE II

In a run carried out by the process of this invention isoprene is trimerized to 1,5,9-trimethyl-1,5,9-cyclododecatriene. In this run, 50 ml. of heptane is charged to a reaction zone after which 1 millimol of $VCl_4$ and 4 three-component system in that longer times are required for equivalent conversion using the two-component system.

EXAMPLE V

In another run, 50 ml. of chlorobenzene and 25 ml. of benzene are charged to a reaction zone, after which 1 millimol of $VCl_4$ and 6 millimols of $TiCl_4$ are charged to said zone. After introduction of the metal halides, 40 millimols of dimethylaluminum bromide is charged to the reaction zone. Butadiene is then charged to the zone by the method of Example I, and cooling is supplied to maintain the temperature of the reaction mixture at 0° C. The butadiene is converted to trans, trans, cis-1,5,9-cyclododecatriene at a faster rate than in a similar run omitting the $VCl_4$ from the catalyst system.

Reasonable variation and modification are possible within the scope of this invention which sets forth a new catalyst system for the trimerization of dienes to cyclododecatrienes and a process for the trimerization of dienes to cyclododecatrienes.

We claim:

1. A process for the production of a 1,5,9-cyclododecatriene which comprises contacting a reactant compound selected from the group consisting of 1,3-butadiene, isoprene and piperylene with a catalyst system formed by admixing titanium tetrachloride, a dialkylaluminum halide and a vanadium compound selected from the group consisting of vanadium tetrachloride and vanadium oxytrichloride.

2. The process of claim 1 wherein the mol ratio of titanium to vanadium is in the range of 1/1 to 6/1 and the mol ratio of aluminum to titanium is in the range of 2/1 to 10/1.

3. The process of claim 2 wherein the reaction is carried out at a temperature in the range of 0 to 75° C.

4. The process of claim 3 wherein the reaction is carried out in a liquid diluent which is inert to said catalyst system and to said reactant compound and reaction products present in the reaction zone.

5. A process for the production of a 1,5,9-cyclododecatriene which comprises the steps of:
admixing titanium tetrachloride and a vanadium compound selected from the group consisting of vanadium tetrachloride and vanadium oxytrichloride;
admixing with the resulting system formed by admixture of said titanium tetrachloride and said vanadium compound, a dialkylaluminum halide; and
contacting the resulting system formed by admixture of said titanium tetrachloride, said vanadium compound and said dialkylaluminum halide with a compound selected from the group consisting of 1,3-butadiene, isoprene, and piperylene.

6. The process of claim 5 wherein the mol ratio of titanium to vanadium is in the range of 1/1 to 6/1 and the mol ratio of aluminum to titanium is in the range of 2/1 to 10/1.

7. The process of claim 6 wherein the reaction temperature is in the range of 0 to 75° C.

8. The process of claim 7 wherein the reaction is carried out in the presence of a diluent which is inert to said catalyst system and to said reactant compound and reaction products present in the reaction zone.

9. A process for the production of a 1,5,9-cyclododecatriene which comprises the steps of:
admixing titanium tetrachloride and a dialkylaluminum halide;
admixing with the resulting system formed by admixture of said titanium tetrachloride and said dialkylaluminum halide a vanadium compound selected from the group consisting of vanadium tetrachloride and vanadium oxytrichloride;
contacting the resulting system formed by admixture of said titanium tetrachloride, said dialkylaluminum halide and said vanadium compound with a compound selected from the group consisting of 1,3-butadiene, isoprene and piperylene.

10. The process of claim 9 wherein the mol ratio of titanium to vanadium is in the range of 1/1 to 6/1 and the mol ratio of aluminum to titanium is in the range of 2/1 to 10/1.

11. The process of claim 10 wherein the reaction temperature is maintained in the range of 0 to 75° C.

12. The process of claim 11 wherein the reaction is carried out in the presence of a liquid diluent which is inert to said catalyst system and to said reactant compound and reaction products present in the reaction zone.

References Cited by the Examiner
UNITED STATES PATENTS

| | | | |
|---|---|---|---|
| 2,964,574 | 12/60 | Wilke | 260—666 |
| 3,066,126 | 11/62 | Porter et al. | 260—94.3 |
| 3,068,306 | 12/62 | Hay et al. | 260—683.15 |

ALPHONSO D. SULLIVAN, *Primary Examiner.*